June 11, 1963    S. L. STUTZ    3,093,828
DIRECTION FINDING ANTENNA
Filed June 20, 1961    2 Sheets-Sheet 1

INVENTOR.
SHERLA L. STUTZ
BY
ATTORNEYS

June 11, 1963 S. L. STUTZ 3,093,828
DIRECTION FINDING ANTENNA
Filed June 20, 1961 2 Sheets-Sheet 2

INVENTOR.
SHERLA L. STUTZ

United States Patent Office 3,093,828
Patented June 11, 1963

3,093,828
DIRECTION FINDING ANTENNA
Sherla L. Stutz, Lewisburg, Ohio, assignor to the United States of America as represented by the Secretary of the Air Force
Filed June 20, 1961, Ser. No. 118,476
2 Claims. (Cl. 343—118)
(Granted under Title 35, U.S. Code (1952), sec. 266)

The invention described herein may be manufactured and used by or for the United States Government for governmental purposes without payment to me of any royalty thereon.

The invention relates to an automatic direction finding antenna system and a direction finding antenna which is advantageously usable with the system. The direction finding antenna is constructed to have a rotating asymmetrical receiving antenna pattern which with the aid of electronic circuitry provides target information on a millisecond time basis.

The automatic direction finding systems of the prior art are basically electromagnetic-mechanical devices consisting of a rotatable loop antenna, electrically driven synchro generators and synchro motors, alternating current or direct current loop driving motors in accompaniment with a radio receiver, a discriminator-amplifier and some type of synchro driven azimuth indicator. This equipment will provide adequate direction finding under conditions of low rates of closure upon the target or home station, however, when the closure rate is in the order of 400 to 4000 feet per second, the time required to start and rotate the antenna loop and in turn the azimuth indicator needle, to indicate bearing to station or station passage, the accuracy of heading is largely erroneous and the station passage indication is meaningless. Further, the prior art equipment was not designed for ground target marking, a function for which it is usually used in addition to bearing or heading information.

When using present day automatic direction finding systems in conjunction with high-speed jet aircraft large errors are encountered. Under a typical high performance maneuver of a jet aircraft, even at low altitude, heading or bearing errors can be as much as 90 degrees and station passage as out-of-date as two or three miles. For high speed search and rescue, in the best of weather, a to-be-rescued party either at sea or on land can not be spotted in a circle of four to six miles in diameter.

The prior art automatic direction finding system which is basically an electromagnetic-mechanical device is quite sensitive to environments short of laboratory conditions. The mechanical parts require almost constant lubrication and maintenance. Further, the problems of centrifugal and G-forces and temperature must be provided for in the design since there are numerous mechanical moving parts.

It is an object of this invention to provide a direction finding antenna having a conducting or nonconducting ground plane whose radio efficiency varies in azimuth angle roughly similar to that of a cardioid radiation pattern.

It is a further object of this invention to provide a direction finding antenna having a conducting or nonconducting ground plane whose sectorial efficiency can be varied sequentially in azimuth so as to provide an azimuthal rotation to the aperture pattern of the antenna.

It is a still further object of this invention to provide an automatic direction finding antenna system which eliminates the problems of maintenance, inaccuracy, and belated station passage information presented to the pilot.

It is an additional object of this invention to provide an automatic direction finding antenna system having no moving parts and capable of varying azimuthal sensing and information readout that is current to the order of microseconds.

The nature of the invention, further objects and advantages will appear more fully on consideration of the embodiments illustrated in the accompanying drawings and hereinafter to be described.

In the drawings:

FIGURE 3 is a representation on the face of the cathode ray tube indicator used in the automatic direction finding antenna system.

Figure 1:
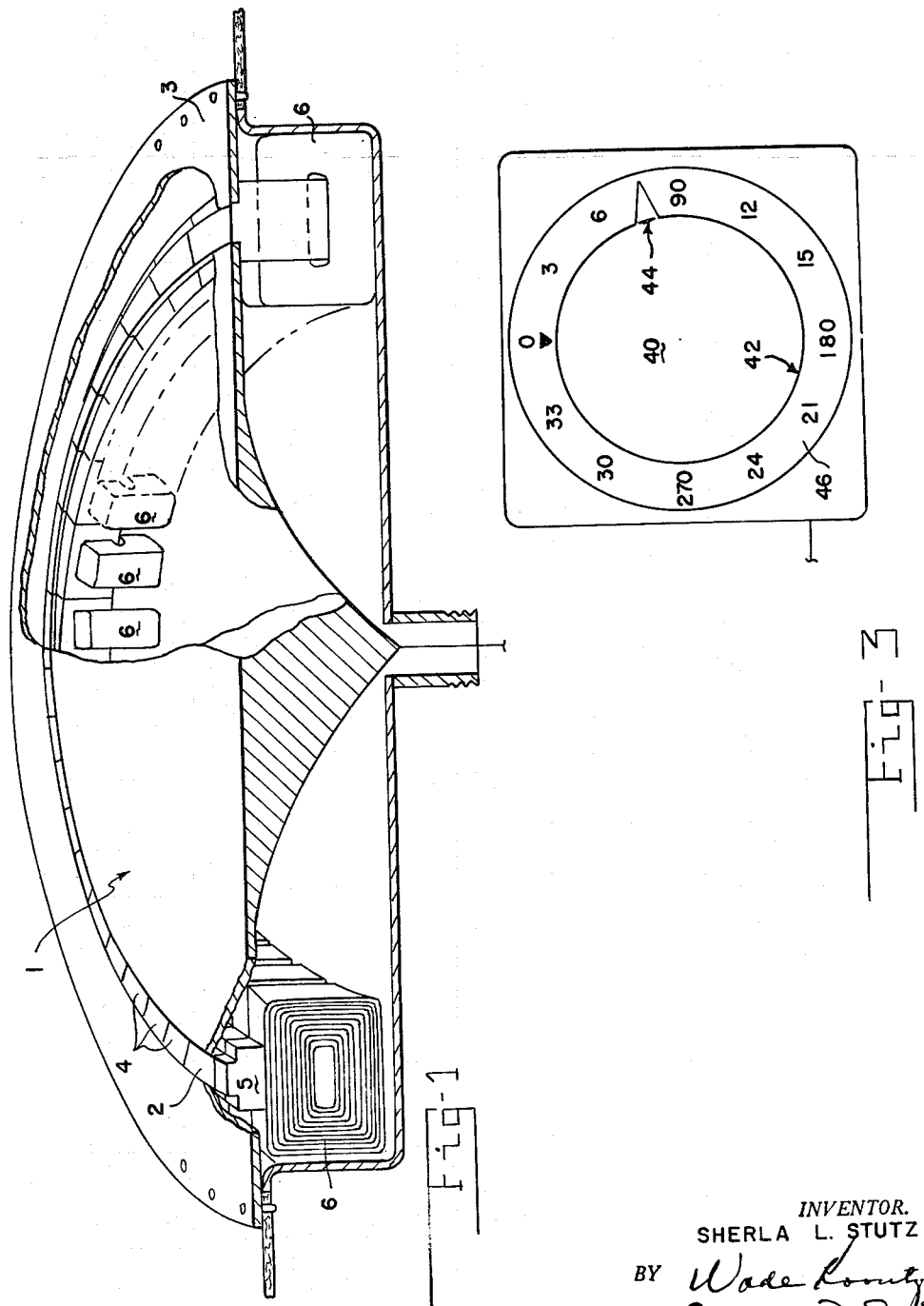
FIGURE 1 is a cutaway perspective illustration of the novel automatic direction finding antenna.

Referring now more particularly to FIGURE 1, there is shown an antenna 1 comprising a radiating or receiving element of resonant or nonresonant size and configuration. In cross section the antenna is a flat circle disc. The disc-shaped antenna 1 is surrounded by the ground plane 3 but separated therefrom, thus forming an annular disposed insulated space or gap 2 between the antenna and the ground plane. The ground plane 3 of the antenna system extends radially in all directions from the annular gap or insulation and in the same plane as the disc element. A plurality of interference elements 4 are positioned into the annular gap 2. The interference elements 4 are preferably made of ferromagnetic cores 5 with an excitation coil 6 passing through a centrally located opening in and around the core 5. The excitation coils 6 of the plurality of ferrite interference elements are series connected and when fed with a special pulse or alternating current signal wave the variation in the ground plane current is electromagnetically altered, thus changing the antenna system on the direction radiation or receiving capability to the asymmetric condition.

Associated with antenna 1, when the antenna is used as an automatic direction finding antenna, is electronic circuitry capable of sequentially controlling the flux density of the circularly disposed interference elments. The FIGURE 2 schematic diagram illustrates a preferred embodiment of the automatic direction finding system. The plurality of ferromagnetic interference elements 4 in the current path of the ground plane of the antenna are sequentially energized by application of a pulsed signal wave to the excitation coils 6 through connecting means 10. The series of excitation coils may be terminated in its characteristic impedance 11, thus forming a transmission line.

The pulsed signal wave is generated by the alternating current and pulse generator 12. An A.C. sine wave is generated in generator G, rectified by half-wave rectifier 14 and applied to the input of the series connected excitation coils of the interfering elements.

The A.C. sine wave is also applied to circular sweep generator circuit 20 through connecting means 16 and 18. The circular sweep generator outputs are applied to the deflection plates of cathode ray tube 30 which produce a circular Lissajous trace 42 on the screen of the cathode ray tube.

Figure 2:
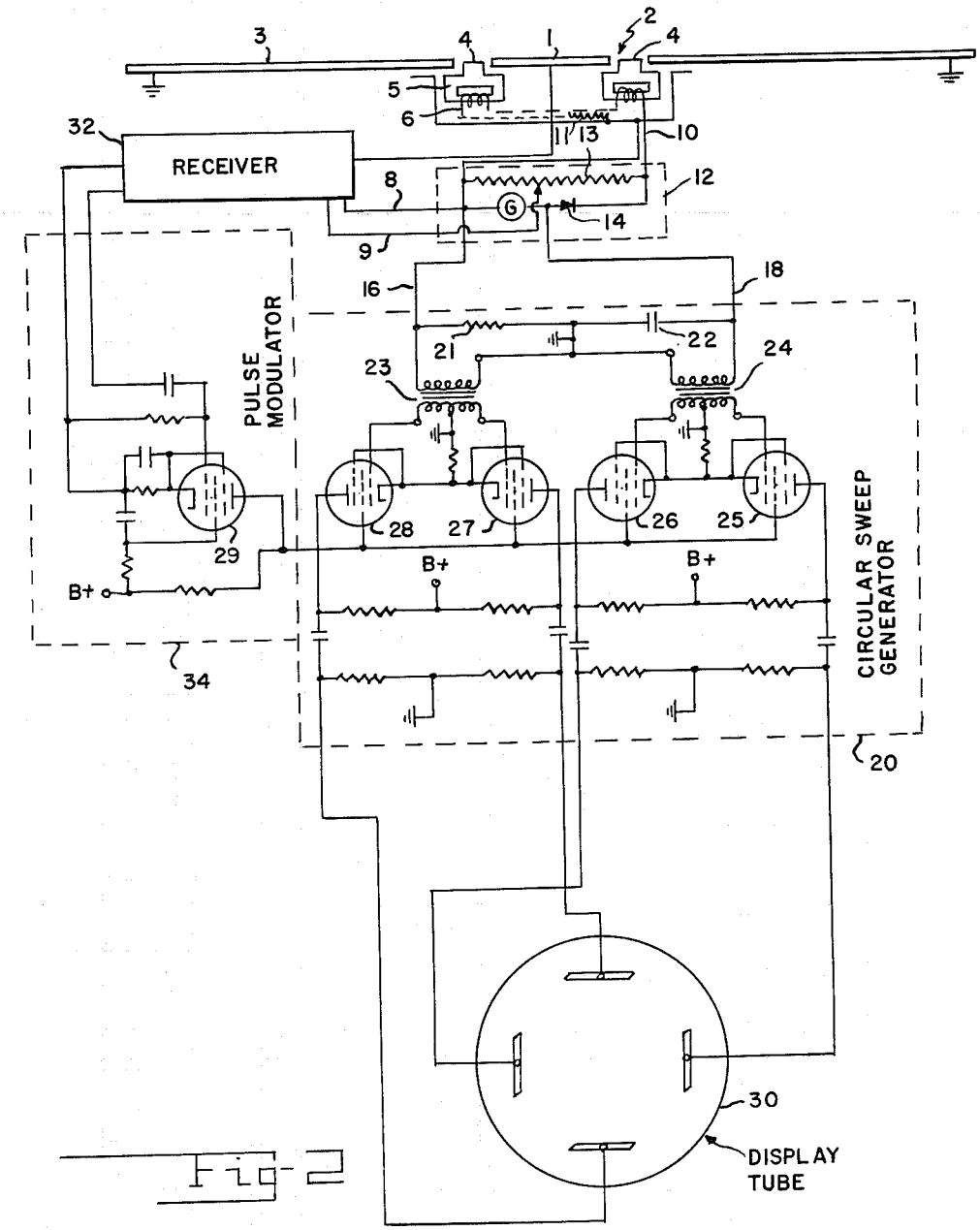
FIGURE 2 is a schematic diagram of the automatic direction finding antenna system.

A preferred circular sweep generator 20 and pulse modulator 34 are illustrated in FIGURE 2. The values of resistor 21 and capacitor 22 are selected to assure that a circular sweep will be generated at the frequency of the applied voltage. The circuit is push-pull operated. That is, the voltage output to one deflecting plate of cathode ray tube 30 is 180° out of phase with the other plate in each pair. The transformers 23 and 24 are used to provide sinusoidal grid signals that are 180° out of phase for the two pairs of push-pull amplifiers. The gain of all four amplifier tubes 25, 26, 27 and 28 is the same, and is controlled by the voltage on the screen grid. The voltage at the plate of tube 29 of the pulse modulator 34 controls the voltage on the screen grids of amplifiers 25, 26, 27 and 28.

The antenna 1 is connected to a receiver 32. The receiver 32 is a conventional superheterodyne receiver having a radio frequency amplifier, mixer and local oscillator, intermediate frequency amplifiers and a detector or demodulator. The antenna, due to its sequentially and sectorially energized ground plane, has a rotating asymmetrical antenna receiving pattern. When external radio frequency signals are impressed upon the antenna from any given azimuth angle or angles, the radio frequency signal is modulated by the rotating asymmetric receiving antenna pattern. A bias pulse is tapped off resistor 13 of the alternating current and pulse generator and applied to the radio frequency amplifier of receiver 32 through conductors 8 and 9 to establish a threshold level thereby reducing the noise level of the receiver. The demodulator of receiver 32 demodulates the modulated radio frequency signal and applies its video pulse output to the grid of the tube 29 of pulse modulator 34.

The voltage at the plate of tube 29 is constant when no video signal is applied to the grid of the tube 29. A circle will be traced on the screen of cathode ray tube 30 during this period of constant voltage. However, if a negative pulse is received at the grid of tube 29 from the receiver 32, the voltage at the plate increases for the duration of the pulse. The screen voltage of the amplifier tubes 25, 26, 27 and 28 increases by identical amounts thereby increasing the gain of the tubes during the pulse. The trace 42 will suddenly jump to a circle of increased diameter for the duration of the pulse.

FIGURE 3 shows a typical presentation on the screen 40 of the cathode ray tube used in the automatic direction finding system of the present invention. The Lissajous trace 42 is a uniform circle except for a pip 44 which indicates the presence of an external radio frequency signal. An escutcheon 46 having engraved upon it a compass card and encompassing the scope face marks the angle of arrival of the radio frequency signal as determined by relation to the line of motion of the antenna and consequently the vehicle upon which the antenna is mounted.

The components of the antenna and the automatic direction finding systems are simple, rugged and durable and no moving parts are used. The system requires no routine maintenance and its design permits epoxy potting thereby contributing in a very large measure to its environmental inertness. The systems are particularly adaptable for air-borne applications. The antenna can be readily made a part of the aircraft, because there would be no protruding parts necessary which could increase drag on the aircraft. The ground plane is simply a part of the skin of the aircraft.

While a specific embodiment of the invention has been described in detail by way of illustration, it is understood that the invention is defined solely by the appended claims and embraces any embodiments falling within the terms and spirit thereof.

I claim:

1. An automatic direction finding antenna system for determining the angle of arrival of a radio frequency signal comprising: an antenna; means providing a ground plane for said antenna having a plurality of series connected interference elements equally and uniformly spaced from said antenna inserted in the current path of said ground plane; means for generating a sinusoidal signal wave; means for rectifying said sinusoidal wave thereby providing a pulsed signal wave; means for applying said pulsed signal wave to said elements in series thereby sequentially energizing said interference elements and causing a rotating asymmetric receiving antenna pattern which acts to modulate any radio frequency signal impressed on the antenna; means for demodulating said modulated radio freuency signal coupled to said antenna; a cathode ray tube having two pairs of deflection plates; means for generating a circular sweep on said cathode ray tube; means coupling the output of said sinusoidal signal generator to said circular sweep generator; and means coupled to said circular sweep generator for causing an increase in voltage output from said circular sweep generator during a period when said demodulating means has an output whereby an increase in the circle traced on said cathode ray tube screen results during said increase in output voltage.

2. An automatic direction finding antenna system for determining the angle of arrival of a radio frequency signal comprising: an antenna; means providing an electrically conducting ground plane surrounding said antenna and separated therefrom to form an annular gap; a plurality of interference elements positioned in said annular gap; an excitation coil associated with each of said elements; each of said excitation coils being connected in series to form a transmission line which terminates in a characteristic impedance; means for generating a sinusoidal signal wave; means for rectifying said sinusoidal wave thereby providing a pulsed signal wave; means for applying said pulsed signal wave to the input of said line thereby sequentially energizing said interference elements and causing a rotating asymmetric receiving antenna pattern which acts to modulate any radio frequency signal impressed on the antenna; means for demodulating said modulated radio frequency signal coupled to said antenna; a cathode ray tube having two pairs of deflection plates; means for generating a circular sweep on said cathode ray tube; means coupling the output of said sinusoidal signal generator to said circular sweep generator; and means coupled to said circular sweep generator for causing an increase in voltage output from said circular sweep generator during a period when said demodulating means has an output whereby an increase in the circle traced on said cathode ray tube screen results during said increase in output voltage.

References Cited in the file of this patent

UNITED STATES PATENTS

| | | |
|---|---|---|
| 2,994,874 | Kihn et al. | Aug. 1, 1961 |
| 3,037,185 | Dewitz | May 29, 1962 |

OTHER REFERENCES

I.R.E. National Conventional Record, part I, March 18–21, 1957, pages 144–152.